April 19, 1938.  C. B. MAURER ET AL  2,114,931
EDUCATIONAL DEVICE
Filed Feb. 9, 1937   3 Sheets-Sheet 3
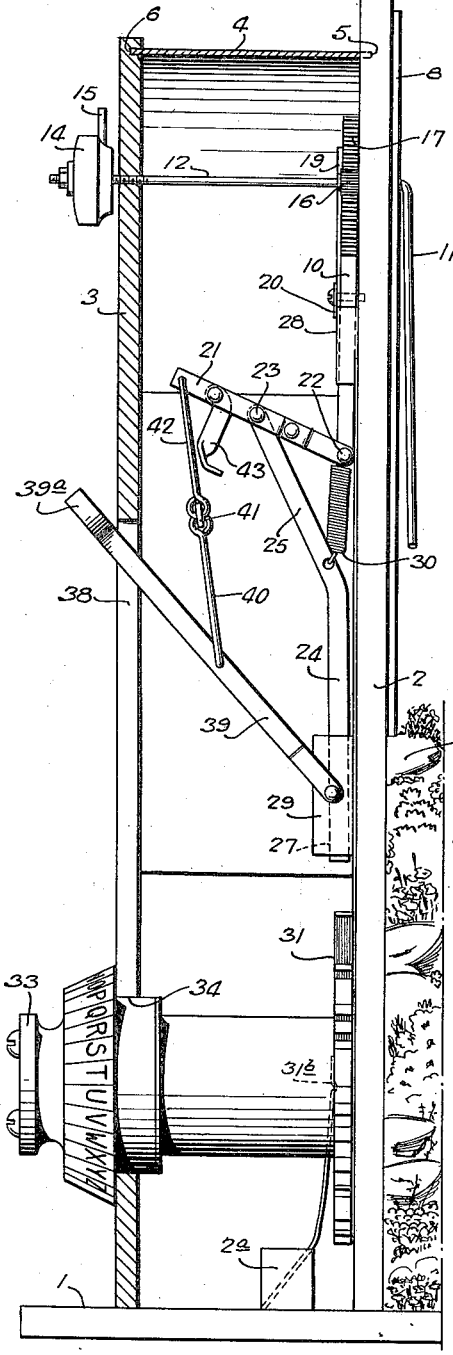
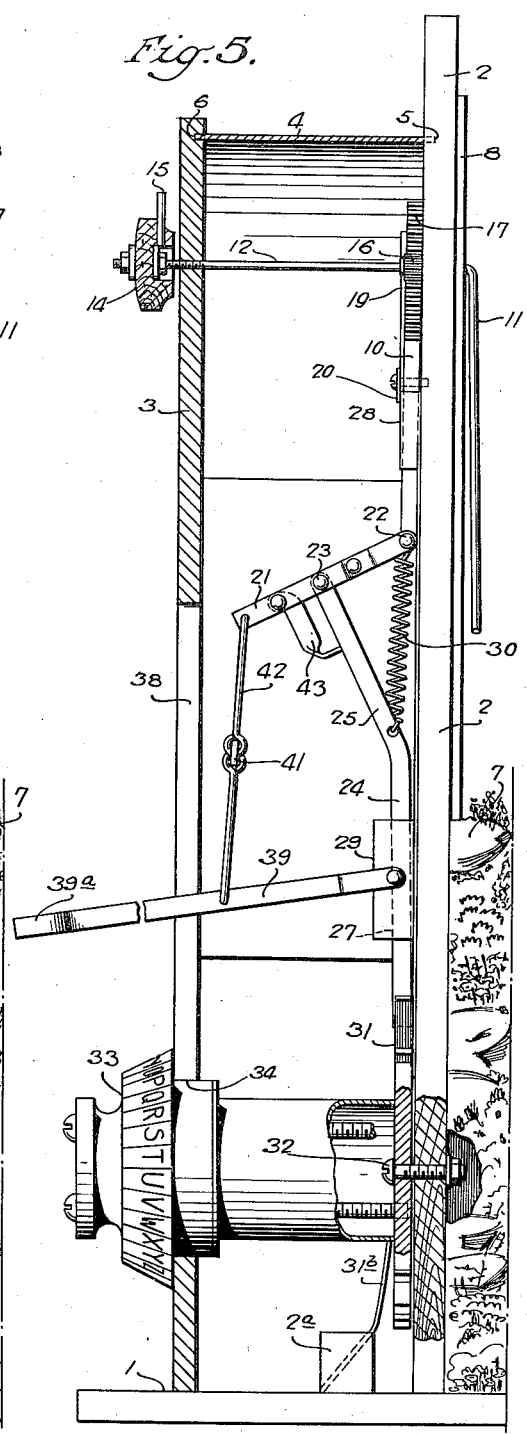
Inventors: Conrad B. Maurer
William T. Bamford
by their Attorneys
Howson & Howson Patented Apr. 19, 1938

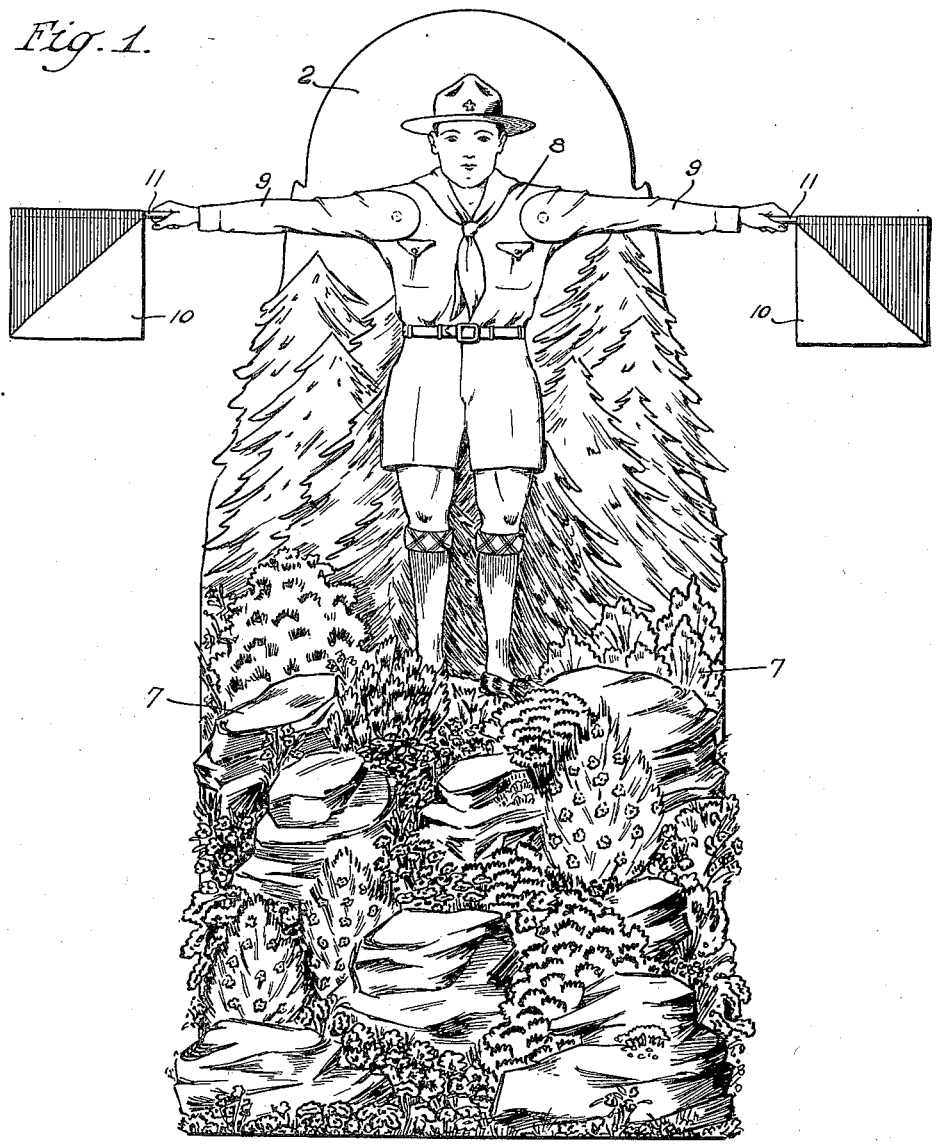

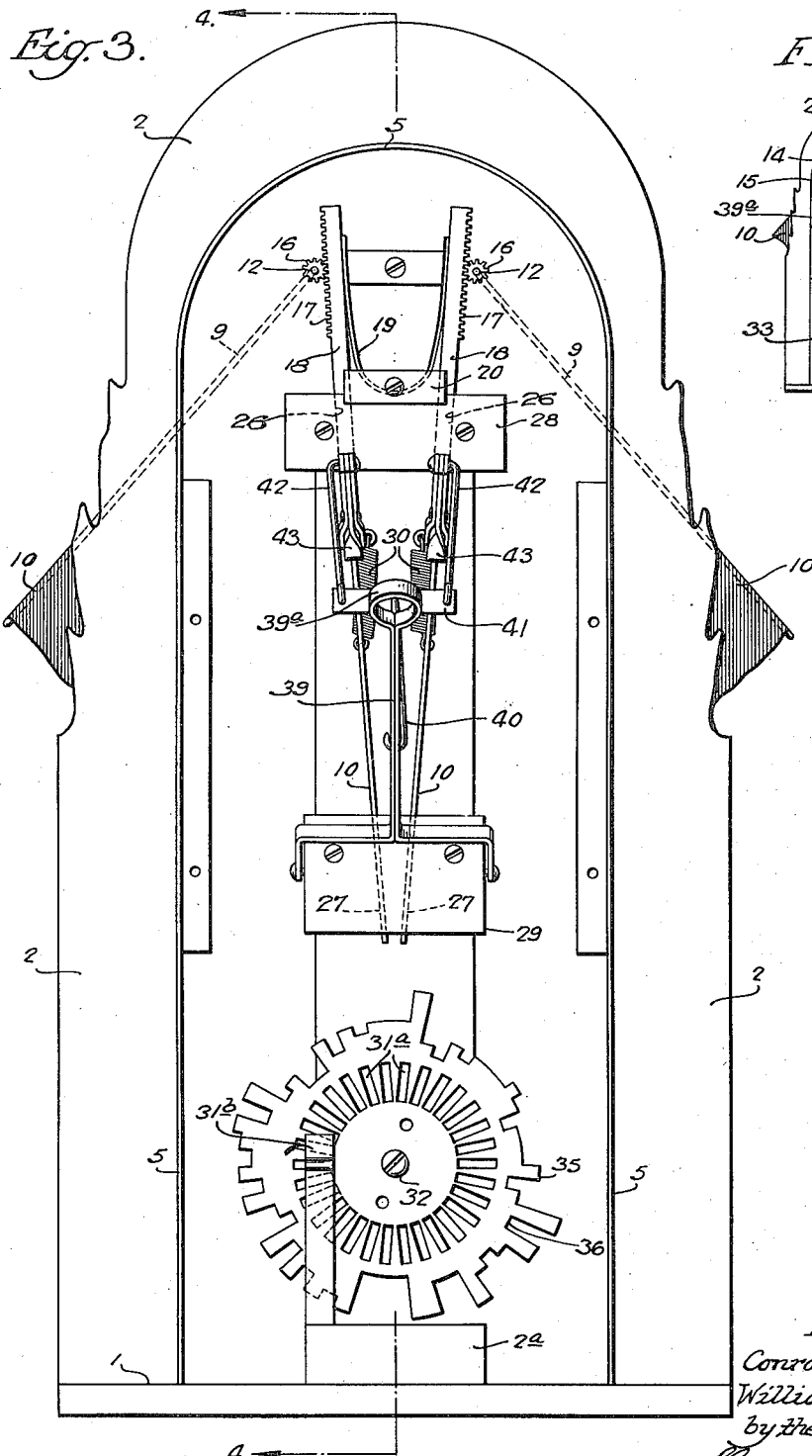

2,114,931

UNITED STATES PATENT OFFICE 2,114,931

EDUCATIONAL DEVICE

Conrad B. Maurer and William T. Bamford, Philadelphia, Pa., assignors to Maurer Paint Company, a copartnership consisting of Conrad B. Maurer and Howard P. Maurer, Philadelphia, Pa.

Application February 9, 1937, Serial No. 124,887

13 Claims. (Cl. 35—14)

This invention relates to new and useful improvements in educational devices and more particularly to devices of this character designed and arranged for use in giving instructions in connection with semaphore signaling.

The principal object of the present invention is to provide a device of the character set forth which is characterized by positive actuation of the semaphores as well as relatively rapid easy operation thereof in assuming predetermined positions in accordance with the instructions to be given.

Another object of the invention is to provide a device of the stated character having novel means operable to selectively position the semaphores in accordance with the desired instructions as well as means operable to permit relatively free independent actuation of said semaphores or either of them to any desired instructive position.

The invention consists further in certain structural features thereof as well as in the combination and arrangement of the several parts of the device whereby the same is rendered more simple, less expensive and otherwise more convenient to operate and use by virtue of the comparatively few operative parts embodied therein.

These and other objects of the invention and the features and details of construction thereof are set forth hereinafter and shown in the accompanying drawings, in which:

Fig. 1 is a front elevation view of a device made in accordance with this invention;

Fig. 2 is a rear elevation view of the disclosure in Fig. 1 with the signal flags in another position;

Fig. 3 is an enlarged view similar to Fig. 2, the rear cover and housing having been removed to better illustrate certain structural and operative features and details of the device.

Fig. 4 is a fragmentary view in section on line 4—4, Fig. 3 showing the relative positions of the several parts of the device in the normal inoperative position; and Fig. 5 is a view in section similar to Fig. 4, certain parts thereof being shown in full and illustrating the relative positions of the several parts of the device in operative position.

Referring now more particularly to the drawings, an educational device made in accordance with the present invention comprises a base 1 and substantially vertical spaced parallel wall members 2 and 3, the space between said wall members being enclosed by means of a casing, housing or the like 4 disposed therebetween and engaging grooves 5 and 6 in the walls 2 and 3 respectively. A scenic representation of a hill top, knoll or the like 7 is provided forwardly of the outer face of the wall 2 and this is surmounted by a replica of a boy scout or the like 8 whose arms 9 simulate semaphores with the hand portions of said arms grasping the signal flags 10.

In the present instance the arms 9 of the figure 8 are fixedly secured to the radially projecting portions 11 of each of a pair of shafts 12 which are rotatably mounted in spaced parallel relation horizontally in the wall members 2 and 3 adjacent the upper ends thereof. Actuating dials or knob members 14 are secured to the rear or opposite ends of said shafts 12 from the arms 9, and these dials or knobs are provided with pointers or the like 15 disposed in the same plane as the radially projecting portions 11 of the shafts 12 corresponding to the relative angular position of the arms 9 and signal flags 10. Consequently, it will be observed that by rotation of the dial or knob members 14 just described, the shafts 12 are similarly rotated so that the arms 9 and signal flags 10 may be positioned in any desired angular position with respect to each other as desired for a purpose which will appear hereinafter.

As herein disclosed, a pinion 16 is fixedly secured upon each of the shafts 12 for rotation therewith and elongated straight racks 17 are formed at the upper end portions of a pair of rods 18 and retained in mesh with said pinions 16 by means of a bow spring or other resilient means 19 disposed between said upper end portions of said rods 18 and tending to separate the latter, said spring 19 being in turn held in position by a cross member or other suitable means 20. The rods 18 in the present instance are of the same or equal length and are each pivotally connected at their lower ends to the upper end of a link 21 as indicated at 22. The links 21 are pivoted substantially at their midpoints as at 23 to the upper ends respectively of rods or the like 24, which like rods 18 are of the same or equal length, but have their upper portions inclined outwardly as shown at 25. As shown, each pair of rods 18 and 24 are slidably mounted in sets of grooves 26 and 27 respectively formed in blocks or other guide means 28 and 29 mounted in vertically spaced relation at the rear or inner face of the front wall member 2, and these pairs of rods 18 and 24 are normally maintained in minimum spaced relation, as shown in Fig. 4 of the drawings, by means of springs or other resilient means 30 which are connected between each set of said rods, thus retaining said rods 24 in substantially raised or elevated position with their lower ends cleared from possible contact with a selective signal position determining disk or like element 31 located therebelow.

As shown in Figs. 3, 4, and 5 of the drawings, the signal determining disk or member 31 just mentioned, is rotatably mounted vertically below the lower ends of the rods 24 by means of a screw, shaft or the like 32, and a dial, knob, or other actuating member 33 for said disk 31 is secured to the latter and rotatably mounted in an opening 34 adjacent the lower end of the rear wall member 3, said actuating dial or knob 33 having a portion of its periphery disposed at an angle and divided into sections each of which is marked with a letter of the alphabet, number, or other symbol, or any combination thereof arranged in clockwise sequence thereon. Referring particularly to Fig. 3 of the drawings, it will be observed that the signal position determining disk 31 is similarly divided into sections corresponding to the indications on the actuating dial 33 and these sections are provided with radial slots of different depths indicated generally by reference numerals 35 and 36, constructed and arranged to correspond with certain fixed angular positions of the semaphore arms 9 and signal flags 10 which correctly represent the particular letter, number, or symbol on the actuating dial 33, positioned opposite a pointer or like indicator 37 by rotation of said dial. For the purpose of retaining the dial 33 and signal position determining disk 31 against accidental displacement from any predeterminedly selected position, a series of recesses, depressions or the like 31a are formed in the face of said disk 31 and arranged at equally spaced intervals opposite each of the several sections thereof corresponding to the symbols to be represented as indicated by the indicia on the dial 33, and a resilient member 31b having an outwardly projecting boss, ridge, or the like adjacent its free end for engagement with said recesses 31a in the manner shown in Fig. 3 of the drawings hereof, is secured in a block 2a opposite the disk 31 and fixed on the base 1 of the device.

In the present instance a vertical slot 38 is provided in the rear wall member 3 of the device and a rod or the like 39 having a handle portion 39a is hingedly connected to the block 29 for movement vertically within said slot 38 in the manner shown in Figs. 4 and 5 of the drawings hereof. Referring now particularly to Figs. 3, 4, and 5 of the drawings, the vertically movable actuating rod 39 is connected by means of a link or the like 40 to the midpoint or center of a bar or plate member 41 the opposite ends of which are respectively connected by other links 42 to the outer end of each of the links 21. In the present instance, the links 21 and their associated actuating mechanism just described are normally retained in a relatively raised or elevated position shown in Fig. 4 of the drawings by means of the rods 24 which are pivotally connected to said links 21 and themselves retained in a relatively raised or elevated position with respect to the disk 31 by means of the previously mentioned springs 30.

In the normal inoperative state of the present invention, the several parts of the device assume the relation shown in Fig. 4 of the drawings. On the other hand, when the rod 39 is actuated downwardly within the vertical slot 38, the links 21 are similarly actuated about their pivots 22 through links 40 and 42 and plate 41, and this rotation of the links 21 causes the rods 24 to be displaced vertically downwardly until the lower ends thereof abut or engage the periphery of the signal position determining disk 31. The extent of rotation of the links 21 about their pivots 22 in each instance is limited by means of substantially L-shaped brackets 43 which are secured to the links 21 and arranged to engage the outwardly inclining upper portion of each of the bars or rods 24 in the manner shown in Fig. 5, thus definitely fixing the extent of the relative vertical separation of the rods 18 and 24 in each pair.

Depending upon the depth, or conversely the height, of the periphery of the disk 31 in each signal position section thereof, actuation of the rod 39 downwardly will in certain instances cause the lower ends of the rods 24, or one of them, to engage the bottom or bottoms of said grooves 35 and 36 in the particular section before one or both of the links 21 have rotated through the maximum distance afforded by the brackets 43, in which event further downward movement of the actuating rod 39 causes one or both of said links 21 to continue to rotate about its pivot point 23 to the full extent afforded by the brackets 43, thus causing a relative vertical displacement upwardly of the associated rod 18 to a position in greater spaced relation with respect to the now stationary rod or rods 24.

On the other hand, and also depending upon the depth or height of the grooves 35 and 36 in a particular section of the disk 31, actuation of the rod 39 will in certain instances cause one or both of the links 21 to rotate through the maximum distance or arc fixed by the brackets 43 before the lower ends of the associated rod 24 engages the bottom surface of its groove 35 or 36, in which event further downward movement of the actuating rod 39 will cause the rods 18 and 24 of one or both pairs to be displaced simultaneously downward until the lower ends of both of said rods 24 abut or engage the bottom surfaces of said grooves. In addition, certain few instances will exist in which engagement of the lower ends of one or both of the rods 24 with its disk surface 35 or 36 will be simultaneous with engagement of the corresponding bracket 43 or both of them with the upper portion of said rods 24, and in such case operation of the device will not be accompanied by a vertical displacement of the rod 18 in the particular pair of such rods as may be actuated under this particular circumstance.

It should be pointed out at this time, however, that the grooves 35 and 36 for any one section of the signal determining disk 31 for the most part are of different depths, and it will be observed that in such instances downward movement of the rod 39 will actuate one rod assembly, consisting of a rod 18, link 21 and a rod 24, a greater distance than the other rod assembly, although in certain instances depending upon the letter or symbol it is desired to represent by the relative positions of the arms 8, the vertical displacement of both rod assemblies may be substantially the same or equal, as for example where the grooves 35 and 36 for the particular section of the disk 31 corresponding to the desired representation are of the same depth.

In operation of the device, the instructor or user thereof first rotates the selector dial 33 until the desired letter, number, or symbol thereon is disposed opposite the indicator 27 located on the rear face of the wall member 3. This rotation of the dial 33 is accompanied by a corresponding rotation of the signal determining disk 31 to position the desired groove formation 35 and 36 in the periphery thereof at the top directly in alignment with the lower ends of the rods 24. The rod 39 is then actuated downwardly in the slot 38 in the rear wall member 3 to the position shown in Fig. 3 of the drawings hereof, thus causing the links 21 to rotate in a counterclockwise direction with respect to Figs. 4 and 5 of the drawings and lower the rods 24, which latter movement may or may not be accompanied by movement of one or both of the rods 18 in the same or opposite directions, depending upon the depth of the particular grooves 35 and 36 and the differential, if any, existing between either of them.

Movement of either one or both of the rods 18 in one direction or the other is of course accompanied by a corresponding rotation of the pinion 16, arms 9 and signal flags 10 at the front of the device into the desired signal position as determined by the abutting surfaces presented by the bottoms of the grooves 35 and 36 in the disk 31. As soon as the semaphore signal representing the letter first decided upon is completed in the foregoing manner, pressure on the actuating rod 39 is released, and the springs 30 function respectively to raise or elevate the rods 24, links 21 and rod 39, thus freeing the lower ends of said rods 24 from engagement with the grooves 35 and 36 in the disk 31 and thereby resetting the device for rotation of the signal position determining disk 31 and its dial 33 to the next letter, number, or symbol desired to be represented by semaphore signal.

In addition to operation of the device in accordance with the foregoing description, the same may be operated to position the arms 9 and signal flags 10 in any desired angular position with respect to each other by rotation of the actuating dial or knob members 14 secured directly to the shafts 12 without interference from or with the signal positioning mechanism described in the foregoing paragraphs, and either method of operation of the device may be employed interchangeably at the will of the operator as desired.

While a specific embodiment of the invention has been set forth for descriptive purposes, it is not intended that said invention shall be precisely limited thereto but that changes and modifications may be incorporated therein within the scope of the annexed claims.

We claim:

1. In a device of the character described, the combination with means adapted for variable operation, of means having a fixed extended length and arranged for relative longitudinal movement to actuate said first means, means arranged for engagement by said second means when extended operable to control the extent of longitudinal movement of the second means and predetermine the ultimate relative positions thereof, and means operable to actuate the second means into engagement with the last mentioned means and effect relative longitudinal movement of said second means into the relative positions determined by the last-mentioned means.

2. In a device of the character described, the combination with means adapted for variable operation, of means having a fixed extended length and arranged for relative longitudinal movement to actuate said first means, selective means arranged for engagement by said second means when extended operable to variably control the extent of longitudinal movement of the second means and predetermine the ultimate relative positions thereof, and means operable to actuate the second means into engagement with the last mentioned means and effect relative longitudinal movement of said second means into the relative positions determined by the last mentioned means.

3. In a device of the character described, the combination with means adapted for variable operation, of means having a fixed extended length and arranged for relative longitudinal movement to actuate said first means, means having a plurality of surfaces for selected engagement by said second means when extended to control the extent of longitudinal movement of the second means and determine the ultimate relative longitudinal positions thereof, and means operable to actuate the second means into engagement with the last mentioned means and effect relative longitudinal movement of the second means into the relative positions determined by the last mentioned means.

4. In a device of the stated character, the combination with means adapted for variable operation, of contractible means having a fixed extended length and arranged for relative longitudinal movement to actuate said first means, means having a plurality of surfaces for selective engagement by said contractible means when extended to determine the ultimate relative longitudinal positions thereof, and means operable to extend the contractible means and actuate the same into engagement with the last mentioned means and the relative longitudinal positions determined thereby.

5. In a device of the stated character, the combination with means adapted for variable operation, of contractible means having a fixed extended length and arranged for relative longitudinal movement to actuate said first means, means tending to contract the contractible means, means having a plurality of surfaces for engagement by said contractible means when extended to determine the ultimate relative longitudinal positions thereof, and means operable to extend the contractible means and actuate the same into engagement with the last mentioned means and the relative longitudinal positions determined thereby.

6. In a device of the stated character, the combination with means adapted for variable operation, of contractible means having a fixed extended length and arranged for relative longitudinal movement to actuate said first means, means having a plurality of surfaces constituting abutments for selective engagement by said contractible means when extended to determine the ultimate relative longitudinal positions thereof, and means operable to extend the contractible means and actuate the same into engagement with the last mentioned means and the relative longitudinal positions determined thereby.

7. In a device of the stated character, the combination with means adapted for variable operation, of contractible means having a fixed extended length and arranged for relative longitudinal movement to actuate said first means, means tending to contract said contractible means, means having a plurality of surfaces constituting abutments for selective engagement by said contractible means when extended to control the extent of longitudinal movement of the second means and determine the ultimate relative longitudinal positions thereof, and means operable to extend the contractible means and actuate the same into engagement with the last mentioned means and the relative longitudinal positions determined thereby.

8. In a device of the character described having a pair of rotatable arms arranged for variable operation to positions representing semaphore code signals, an actuating mechanism for said arms including contractible members arranged for relative longitudinal movement to actuate said arms, means for extending the said members and effecting relative longitudinal movement thereof, and means having a series of variably arranged surfaces constituting abutments for selective presentation to and engagement by the lower ends of said members to predeterminedly fix the extent of relative longitudinal movement of each of the members to position the arms in the desired angular relation with respect to each other.

9. In a device of the character described, an actuating mechanism including pivoted elements, pairs of rods operatively connected to said pivoted elements and arranged for relative vertical movement, resilient means connected between the rods of each pair tending to move the same toward one another, and means operable to rotate said pivoted elements and extend the rods in each pair with respect to each other against the action of said resilient means.

10. In a device of the character described having means arranged for variable operation to positions representing semaphore code signals, an actuating mechanism for said means including pairs of contractible members arranged for relative longitudinal movement, means tending to contract the last mentioned means, means having a series of variably arranged surfaces constituting abutments for presentation to one of each pair of movable members to predeterminedly fix the extent of relative longitudinal movement thereof to position the first means in the desired angular position with respect to each other, and means operable to extend said contractible means into engagement with the last mentioned means and effect a relative longitudinal adjustment of said members with respect to the surfaces of the last mentioned means to position the first means in the desired angular relation with respect to each other.

11. In a device of the character described having means arranged for variable operation to positions representing semaphore code signals, an actuating mechanism for said means including pairs of contractible members having a fixed extended length and arranged for relative longitudinal movement, means tending to contract the last mentioned means, means having a series of variably arranged surfaces constituting abutments for presentation to one of each pair of movable members to predeterminedly fix the extent of relative longitudinal movement thereof to position the first means in the desired angular position with respect to each other, means operable to extend said contractible means into engagement with the last mentioned means and effect a relative longitudinal adjustment of said members with respect to the surfaces of the last mentioned means, said means also including actuable elements arranged to telescope one of each pair of the members and effect a further relative longitudinal adjustment thereof in instances where permitted by such surfaces to position the first means in desired angular relation with respect to each other, and resilient means controlling the movement of said telescoping elements to permit relative variations in the extent of such further longitudinal adjustment of said pairs of members with respect to each other.

12. In a device of the character described the combination with a supporting structure, a pair of shafts rotatably mounted in said structure in relatively spaced relation and including angularly disposed portions overlying one face of said supporting structure, a signal flag secured to the angularly disposed portion of each shaft for movement therewith upon rotation of said shafts, and hand grip elements secured to the extremities of the shafts at the opposite side of the supporting structure from said signal flags for rotating said shafts independently of each other at will.

13. In a device of the character described the combination with a supporting structure, a pair of shafts rotatably mounted in said structure in relatively spaced relation and including angularly disposed portions overlying one face of said supporting structure, a signal flag secured to the angularly disposed portion of each shaft for movement therewith upon rotation of said shafts, gears mounted upon the shafts for movement therewith, a pair of elements having a fixed extended length and arranged for relative longitudinal movement, a rack carried by each of said elements and engaging the gear on one of said shafts to rotate the latter, means arranged for engagement by said pair of elements when extended operable to control the extent of longitudinal movement of each thereof and the ultimate relative rotation of the shafts, and means operable to actuate the pair of elements into engagement with the last mentioned means and effect relative longitudinal movement of said elements and shafts into the relative positions determined by said last mentioned means.

CONRAD B. MAURER.
WILLIAM T. BAMFORD.